(12) United States Patent
McCoy et al.

(10) Patent No.: US 6,729,638 B2
(45) Date of Patent: May 4, 2004

(54) HITCH RECEIVER ASSEMBLY WITH REAR QUARTERPANEL PROTECTION

(75) Inventors: Richard W. McCoy, Granger, IN (US); Thomas W. Lindenman, South Bend, IN (US)

(73) Assignee: Cequent Towing Products, Inc., Plymouth, MI (US)

(*) Notice: Subject to any disclaimer, the term of this patent is extended or adjusted under 35 U.S.C. 154(b) by 0 days.

(21) Appl. No.: 10/182,258

(22) PCT Filed: Mar. 27, 2001

(86) PCT No.: PCT/US01/09755
§ 371 (c)(1),
(2), (4) Date: Jul. 23, 2002

(87) PCT Pub. No.: WO01/74611
PCT Pub. Date: Oct. 11, 2001

(65) Prior Publication Data
US 2002/0190500 A1 Dec. 19, 2002

Related U.S. Application Data
(60) Provisional application No. 60/194,149, filed on Apr. 3, 2000.

(51) Int. Cl.[7] .............................................. B60R 19/48
(52) U.S. Cl. ...................................... 280/495; 280/505
(58) Field of Search ............................... 280/495, 505, 280/457, 458, 500; 293/115, 108, 117, 142; D12/171, 162

(56) References Cited

U.S. PATENT DOCUMENTS

| 2,283,436 A | 5/1942 | Hawkins, Sr. |
| 2,525,707 A | 10/1950 | Morast |
| 2,525,964 A | 10/1950 | Slaback |
| 2,880,016 A | 3/1959 | Peterson |
| 3,431,005 A | 3/1969 | Priefert |
| 3,455,574 A | 7/1969 | Priefert |
| 3,768,837 A | 10/1973 | Reese |
| 4,032,170 A | 6/1977 | Wood |
| 4,125,214 A | * 11/1978 | Penn ....................... 224/42.08 |
| 4,168,855 A | 9/1979 | Koch |
| D275,475 S | 9/1984 | Turkleson |
| 5,149,122 A | 9/1992 | Helber |
| 5,511,813 A | * 4/1996 | Kravitz ....................... 280/495 |
| D373,557 S | 9/1996 | Shaw et al. |
| 5,620,198 A | 4/1997 | Borchers |
| 5,636,885 A | 6/1997 | Hummel |
| 5,647,621 A | 7/1997 | McClellan |
| D388,386 S | 12/1997 | Sanchez, Jr. |
| 5,707,072 A | 1/1998 | Hopper |
| 6,139,044 A | 10/2000 | Smith et al. |
| 6,234,512 B1 | * 5/2001 | Bettenhausen ........... 280/491.1 |

FOREIGN PATENT DOCUMENTS

WO    WO 01/74611 A1    10/2001

* cited by examiner

Primary Examiner—Lesley D. Morris
Assistant Examiner—Tony Winner
(74) Attorney, Agent, or Firm—King & Schickli, PLLC

(57) ABSTRACT

A trailer hitch assembly (10) includes a U-shaped frame (12), hitch receiver box (14) carried on the frame (12) and a pair of mounting brackets (28) for securing the frame to a towing vehicle. Upstanding bumper guards (40) are provided on the frame (12) at each end. The bumper guards (40) provide bumper and rear quaterpanel protection to the vehicle.

7 Claims, 4 Drawing Sheets

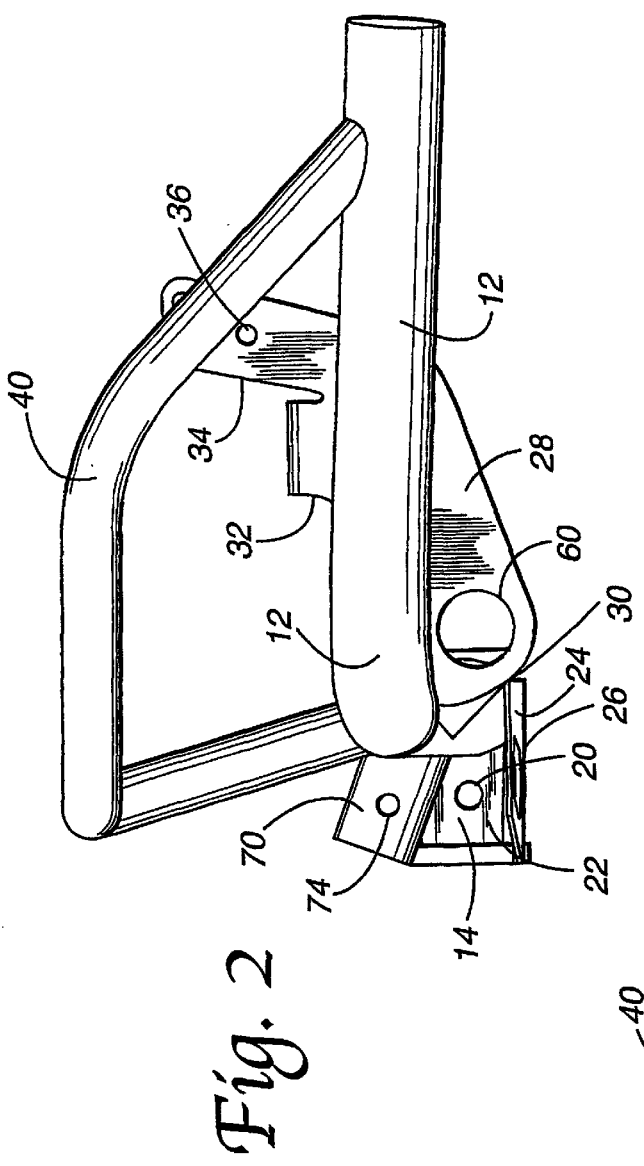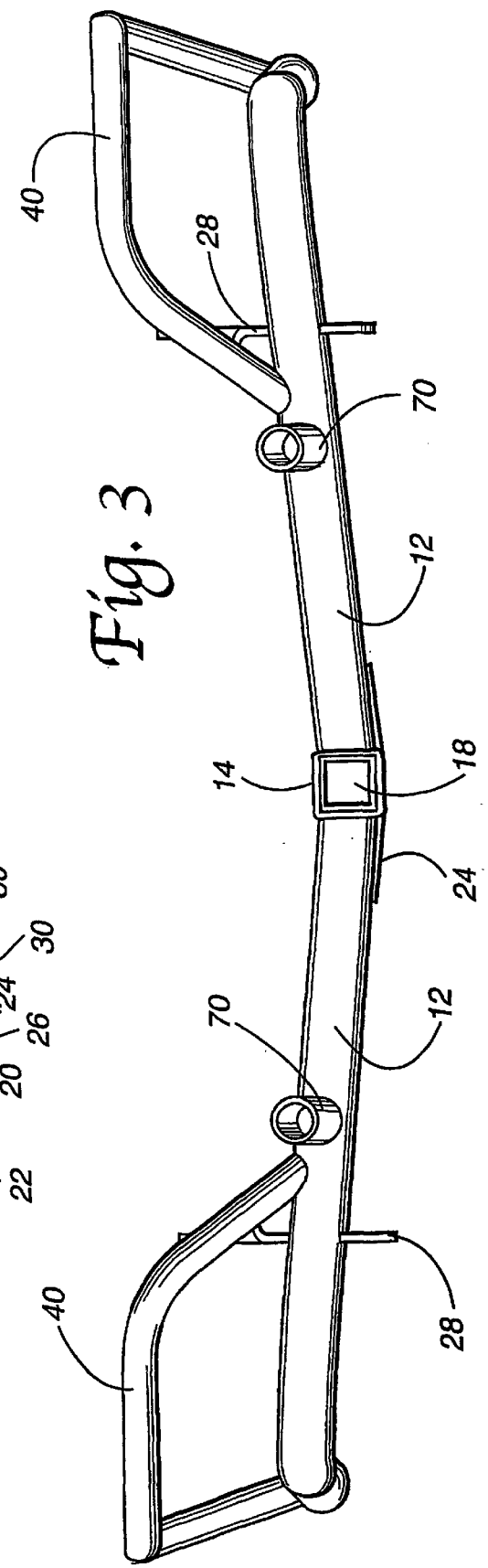

HITCH RECEIVER ASSEMBLY WITH REAR QUARTERPANEL PROTECTION

This is a U.S. National Stage Application of International Patent Application Ser. No. PCT/US01/09755 filed on Mar. 27, 2001 which claims the benefit of U.S. Provisional Application Ser. No. 60/194,149 filed on Apr. 3, 2000.

TECHNICAL FIELD

The present invention relates generally to a trailer hitch assembly incorporating integral quarterpanel protection for the towing vehicle.

BACKGROUND OF THE INVENTION

It has long been known to construct towing hitches that are mounted to vehicles in order to allow the towing of trailers or the like. In recent years, such hitches have been designed to include a receiver box having a rearwardly directed opening or cavity for the receipt of a hitch or draw bar that carries a hitch ball or other means allowing connection to a trailer. Examples of such a structure include U.S. Pat. No. 3,768,837 to Reese and U.S. Pat. No. 5,620,198 to Borchers, both owned by Reese Products, Inc., the Assignee of the present invention.

Oftentimes, the towing vehicle is operated in close quarters and/or around a sometimes cluttered work environment such as a farm, construction site or campsite where the towing vehicle could very easily, be inadvertently backed into an object. Accordingly, it is desirable to provide a trailer hitch assembly providing vehicle bumper and still more preferably, rear quarterpanel protection. This will allow one to better maintain the aesthetic appearance of the vehicle.

SUMMARY OF THE INVENTION

In order to achieve this end, the present invention provides a trailer hitch assembly incorporating integral bumper and rear quarterpanel protection for the towing vehicle. Advantageously, the trailer hitch assembly provides reliable performance over a long service life yet is still relatively inexpensive to produce.

Additional advantages and other novel features of the invention will be set forth in part in the description that follows and in part will become apparent to those skilled in the art upon examination of the following or may be learned with the practice of the invention. The advantages of the invention may be realized and obtained by means of the instrumentalities and combinations particularly pointed out in the appended claims.

To achieve the foregoing, and in accordance with the purposes of the present invention as described herein, an improved trailer hitch assembly is provided. The trailer hitch assembly includes a hitch receiver box, a first L-shaped frame section extending from the receiver box in a first direction and a second L-shaped frame section extending from the receiver box in a second, opposite direction. Together, the hitch receiver box, the first L-shaped frame section and the second L-shaped section form what may be referred to as the hitch frame. A first mounting bracket is carried on the first L-shaped frame section and a second mounting bracket is carried on the second L-shaped frame section. These brackets allow for the mounting of the hitch assembly to the frame of a towing vehicle.

A chain plate engages the hitch receiver box, the first L-shaped frame section and the second L-shaped frame section. The welding of all four of these steel components together insures the provision of a trailer hitch assembly of strong and durable construction.

Advantageously, the L-shaped frame sections extend around the bumper and rear quarterpanels of the towing vehicle to which the trailer hitch assembly is mounted. The L-shaped frame sections function to protect the bumper and particularly the lower rear quarterpanel body work of the vehicle from damage that might otherwise occur when backing the trailer around various objects which might be inadvertently contacted during the vehicle operation.

Additional protection may be provided by upstanding bumper guards. The first bumper guard is carried on the first L-shaped frame section. The second bumper guard is carried on the second L-shaped frame section. Preferably, the bumper guards wrap around the rear corners of the vehicle to provide excellent rear quarterpanel protection under any and all vehicle operating conditions.

Still further, the invention may be described as including a U-shaped frame. A hitch receiver box is carried on the U-shaped frame. A pair of mounting brackets are provided on the U-shaped frame to secure the trailer hitch assembly to the towing vehicle. Upstanding bumper guards may be carried on the U-shaped frame. Together the U-shaped frame and the upstanding bumper guards wrap around the rear quarterpanels of the vehicle to provide excellent protection for the body work.

Still other advantages of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 2 is a side elevational view of the trailer hitch assembly of FIG. 1;

FIG. 3 is a rear elevational view of the trailer hitch assembly of FIGS. 1 and 2;

Reference will now be made in detail to the present preferred embodiments of the invention, examples of which are illustrated in the accompanying drawings.

DETAILED DESCRIPTION OF THE INVENTION

Figure 1:
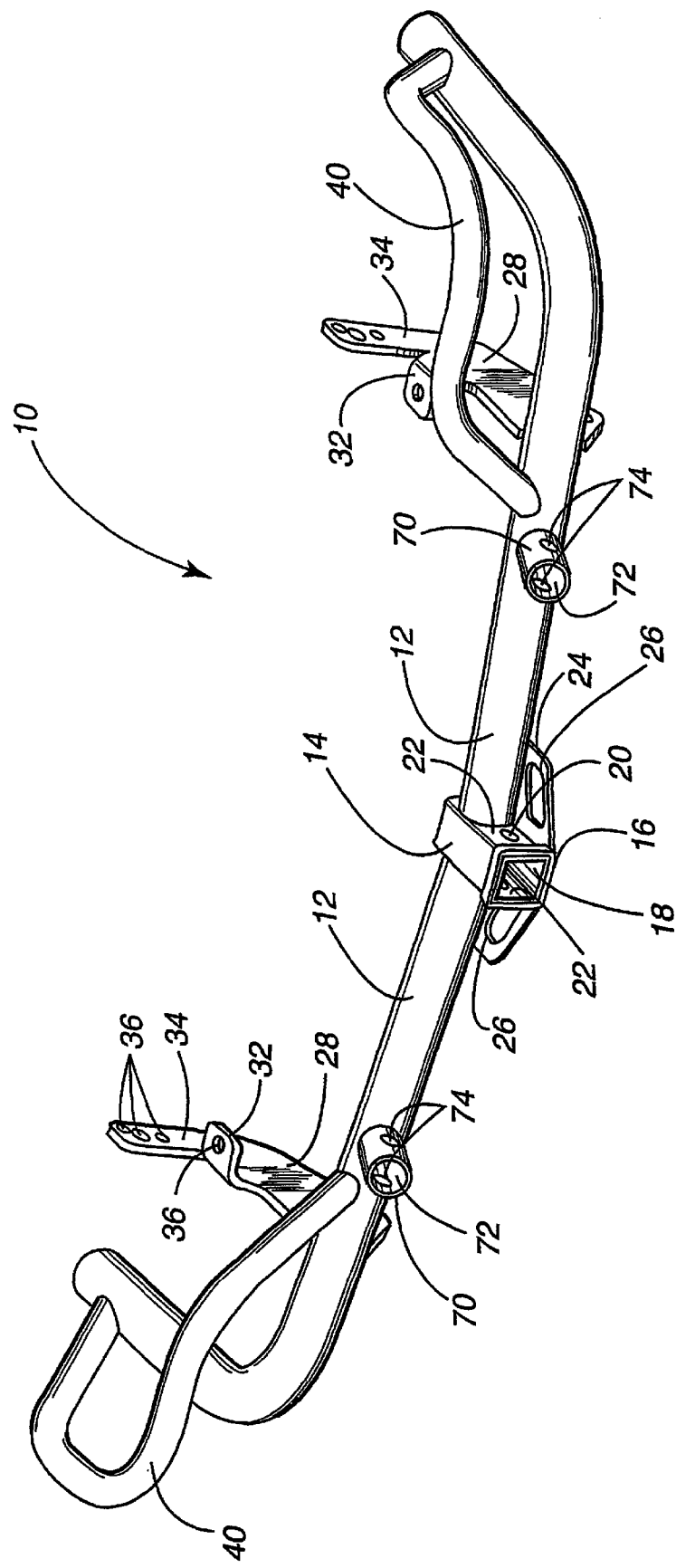
FIG. 1 is a perspective view of the trailer hitch assembly of the present invention.

Reference is now made to FIGS. 1, 2 and 3 showing a trailer hitch assembly 10 of the present invention. The trailer hitch assembly 10 includes a frame or cross member preferably formed from a pair of L-shaped tubular steel sections 12 (i.e. first and second L-shaped frame sections) welded to opposite side walls of a centrally located receiver box 14 so as to project outwardly in opposing directions. The L-shaped tubular steel sections 12 may be formed with a round cross section as shown in the drawing figures, a square cross section, an elliptical cross section or any other appropriate shape providing the necessity strength to function as a trailer hitch assembly.

The receiver box 14 includes a reinforced lip 16 defining an opening leading to a hitch bar receiving cavity 18. Aligned apertures 20 in the opposing side walls 22 of the receiver box 20 allow the secure connection of a hitch bar in the receiver box 14 in a manner well known in the art by means of a connecting pin and cooperating pin clip (not shown). A chain plate 24 of steel material is welded to the receiver box 14 and the L-shaped tubular steel sections 12 in order to strengthen the connection. As is know in the art, chain plate 24 includes two apertures 26. The safety chains of a trailer may be connected to the chain plate 24 through engagement in these apertures 26.

Vehicle mounting brackets 28 are carried on the tubular sections 12. More specifically, a first mounting bracket 28 is carried on a first of the L-shaped frame sections 12 while a second mounting bracket 28 is carried on a second of the L-shaped frame sections. Each mounting bracket 28 includes a notch 30 sized and shaped to receive the tubular section 12. The brackets 28 are welded to the tubular sections 12 in order to complete the connection.

The mounting brackets 28 each include a mounting flange 32 and an upwardly projecting mounting lug 34, both with apertures 36. Nut and bolt fasteners (not shown) are extended through these apertures 36 and cooperating apertures drilled in the frame of the towing vehicle in order to mount the trailer hitch assembly 10 thereto. Of course, the arrangement of the mounting flanges 32 and/or mounting lugs 34 will vary from hitch assembly to hitch assembly in order to correspond to the frame of the vehicle to which the hitch assembly is to be mounted. As such, the arrangement and-orientation of the flanges 32 and lugs 34 in the drawing figures are to be considered illustrative in nature and not as restrictive.

Figure 5A:
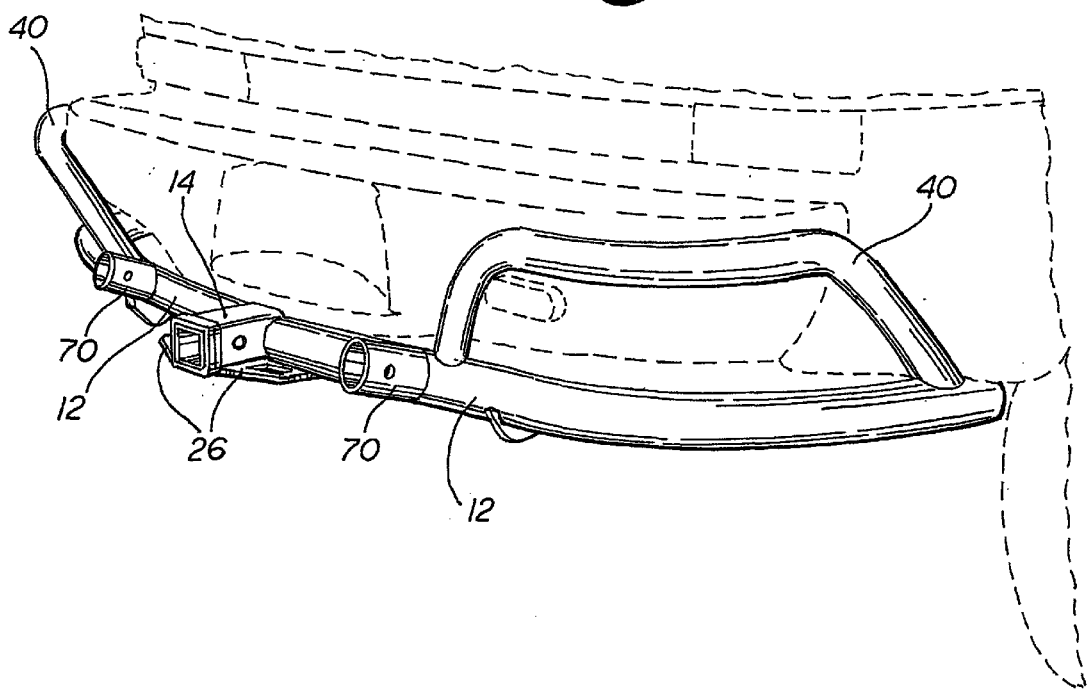
FIGS. 5a and 5b are respective perspective and rear elevational views illustrating how the trailer hitch assembly of the present invention affords protection to the bumper and rear quarterpanels of the vehicle to which they are mounted.
Figure 5B:
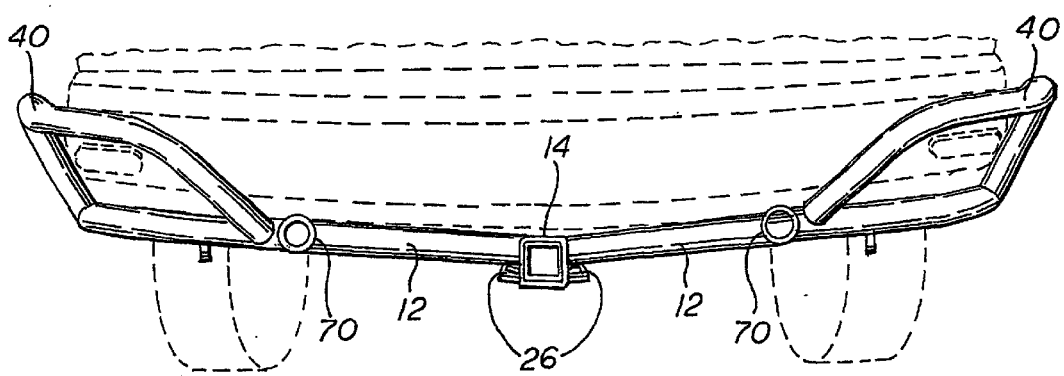

As best shown in FIGS. 1, 5a and 5b, the L-shaped frame sections 12 extend transversely across the rear of the vehicle and forwardly toward the front of the vehicle so as to wrap around the rear quarterpanel of the vehicle to which the trailer hitch assembly 10 is mounted. Upstanding bumper guards 40 may also be carried on the fame sections 12. As best shown again in FIGS. 1, 5a and 5b, each bumper guard 40 is also shaped to wrap around the bumper and body of the towing vehicle with one end welded or otherwise fastened to a first portion of the associated L-shaped section 12 that extends transversely across the rear of the vehicle in a first direction A and the other end welded or otherwise fastened to a second portion of the same L-shaped section that extends longitudinally along a side of the vehicle in a second direction B substantially perpendicular to the first direction A. Together, the L-shaped frame sections 12 and bumper guards 40 provide excellent protection for the corners of the bumper and the rear quarterpanels of the towing vehicle protecting the bodywork from scratches, dents and other damage that might otherwise occur in the event the vehicle bumps into an object during vehicle operation whether towing or otherwise. Further, the wrap around protection is provided with an aesthetically pleasing design featuring an "aggressive" look favored by many vehicle operators.

As also shown in FIG. 2, the trailer hitch assembly 10 may also incorporate a pair of tow hooks or loops 60 integrally formed in each mounting bracket 28. The tow hooks 60 may be engaged with a rope, chain or cable in order to complete certain towing applications in a manner well known in the art.

Additionally, the trailer hitch assembly 10 may incorporate a pair of accessory ports 70. Each accessory port 70 includes a central opening or socket 72 adapted to receive the mounting post or lug of a trailer hitch accessory such as a bike rack, snow board rack, ski rack, cargo carrier or other device of a type well known in the art. Cooperating aligned apertures 74 in the sidewall or sidewalls of each accessory port 70 allow secure connection of the trailer hitch accessory by means of a connecting pin and pin clip of a type well known in the art such as also utilized to connect the hitch bar in the receiver box.

Figure 4:
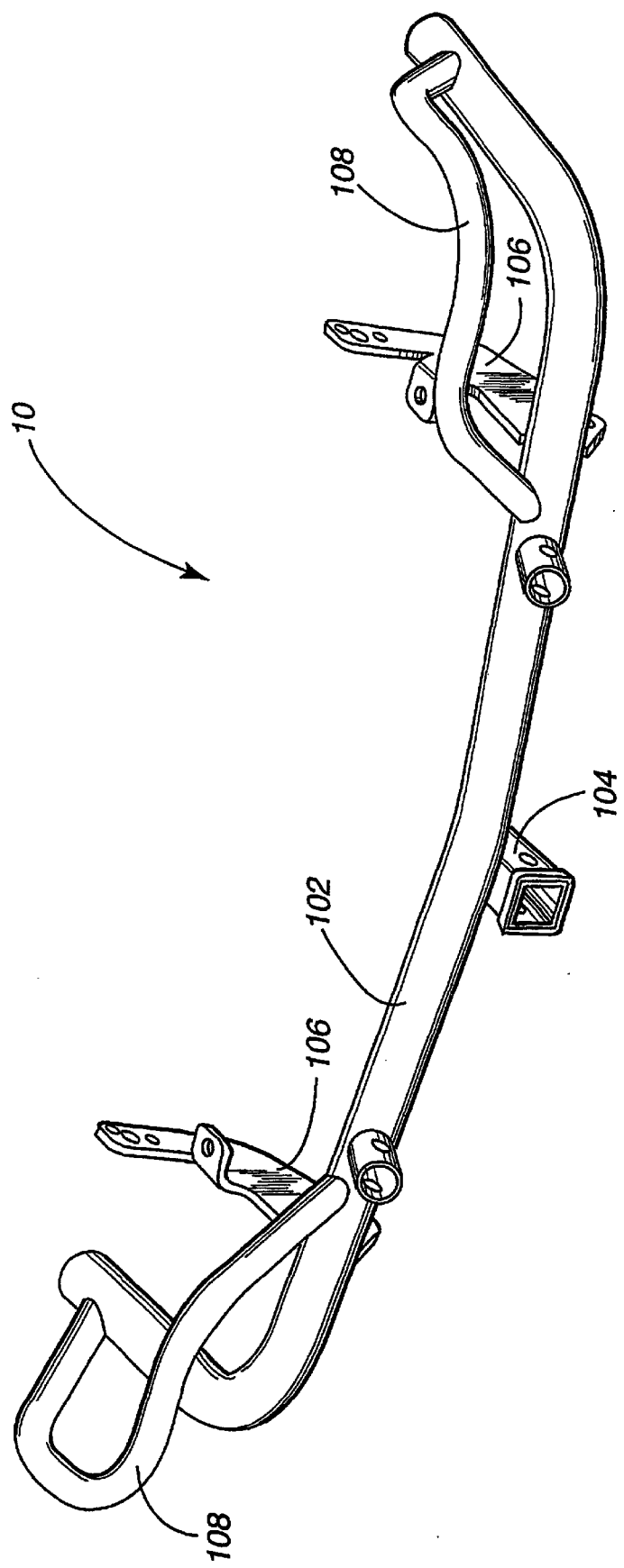
FIG. 4 is an alternative embodiment of the present invention featuring a single piece central frame member and an underslung hitch receiver box.

FIG. 4 shows an alternative embodiment of the present invention. The trailer hitch assembly 100 of FIG. 4 includes a single piece U-shaped frame 102 which carries an underslung hitch receiver box 104. A pair of mounting brackets 106 are welded to the frame member 102 for securing the hitch assembly to a towing vehicle.

As should be appreciated, as with the L-shaped frame sections 12 of the first embodiment, the U-shaped frame 102 extends out and wraps around the rear quarterpanels of the vehicle to which it is mounted. Upstanding bumper guards 108 may also be carried on the frame member 102. These wrap around the corners of the bumper and the rear quarterpanel of the vehicle to provide excellent protection against inadvertent damage from contact with objects during vehicle operation. More specifically, each bumper guard 108 includes a first end mounted to the first portion of the frame 102 that extends transversely across the back of the vehicle in a first direction A and a second end mounted to a second portion of the frame that extends longitudinally along the side of the vehicle in a second direction B substantially perpendicular to the first direction A.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the hitch receiver box may be mounted above or extend through the U-shaped frame member shown in the FIG. 4 embodiment. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A trailer hitch assembly for towing a trailer behind a towing vehicle, comprising:

a hitch receiver box;

a first L-shaped frame section extending from a first side wall of said hitch receiver box;

a second L-shaped frame section extending from a second, opposite side wall of said hitch receiver box, each of said first and second L-shaped frame sections including a first portion connected to said hitch receiver box and extending in a first direction A and a second portion extending in a second direction B;

a first mounting bracket carried on said first portion of said first L-shaped frame section between said hitch receiver box and said second portion of said first L-shaped frame section; and a second mounting bracket carried on said first portion of said second L-shaped frame section between said hitch receiver box and said second portion of said second L-shaped frame section.

2. The trailer hitch assembly set forth in claim 1, including a chain plate engaging said hitch receiver box, said first L-shaped frame section and said second L-shaped frame section.

3. A trailer hitch assembly for towing a trailer behind a towing vehicle, comprising:

a hitch receiver box;

a first L-shaped frame section extending from said hitch receiver box in a first direction;

a second L-shaped frame section extending from said hitch receiver box in a second direction;

a first mounting bracket carried on said first L-shaped frame section;

a second mounting bracket carried on said second L-shaped frame section;

a first upstanding bumper guard carried by said first L-shaped frame section; and a second upstanding bumper guard carried by said second L-shaped frame section.

4. The trailer hitch assembly set forth in claim 3, wherein a first end of said first upstanding bumper guard is mounted to a first portion of said first L-shaped frame section extending in a first direction A and a second end of said first upstanding bumper guard is mounted to a second section of said first L-shaped frame section extending in a second direction B substantially perpendicular to said first direction A.

5. The trailer hitch assembly set forth in claim 4, wherein a first end of said second upstanding bumper guard is mounted to a first portion of said second L-shaped frame section extending in said first direction A and a second end of said second upstanding bumper guard is mounted to a second portion of said second L-shaped frame section extending in said second direction B substantially perpendicular to said first direction A.

6. A trailer hitch assembly for towing a trailer behind a towing vehicle, comprising:

a U-shaped frame;

a hitch receiver box carried on said U-shaped frame;

a pair of mounting brackets carried on said U-shaped frame; and a pair of upstanding bumper guards carried on said U-shaped frame providing bumper and quarterpanel protection for the towing vehicle.

7. The trailer hitch assembly set forth in claim 6, wherein a first end of each of said pair of upstanding bumper guards is mounted to a first portion of said U-shaped frame extending in a first direction A and a second end of each of said pair of upstanding bumper guards is mounted to second portions of said U-shaped frame extending in a second direction B substantially perpendicular to said first direction A.

* * * * *